(12) United States Patent
Mizutani et al.

(10) Patent No.: US 7,606,117 B2
(45) Date of Patent: Oct. 20, 2009

(54) INFORMATION RECORDING AND REPRODUCING APPARATUS, INFORMATION RECORDING MEDIUM AND INFORMATION RECORDING APPARATUS

(75) Inventors: Natsuhiko Mizutani, Tokyo (JP); Tomohiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 11/387,686

(22) Filed: Mar. 24, 2006

(65) Prior Publication Data
US 2006/0233060 A1 Oct. 19, 2006

(30) Foreign Application Priority Data
Mar. 28, 2005 (JP) ............... 2005-090988
Jan. 27, 2006 (JP) ............... 2006-018478

(51) Int. Cl.
*G11B 11/00* (2006.01)
(52) U.S. Cl. .................. 369/13.33; 369/13.01
(58) Field of Classification Search ............ 369/44.23, 369/112.23, 112.24, 13.33
See application file for complete search history.

(56) References Cited

U.S. PATENT DOCUMENTS

| | | | |
|---|---|---|---|
| 5,835,458 A * | 11/1998 | Bischel et al. ............ | 369/44.12 |
| 6,724,694 B2 * | 4/2004 | Knight et al. ............ | 369/13.35 |
| 6,839,306 B1 * | 1/2005 | Hajjar ................... | 369/13.33 |
| 2001/0048643 A1* | 12/2001 | Inoue et al. ............. | 369/13 |
| 2002/0081461 A1 | 6/2002 | Nishikawa et al. | |
| 2003/0035361 A1* | 2/2003 | Knight et al. ........... | 369/112.24 |

FOREIGN PATENT DOCUMENTS

JP 2003-331471 11/2003

\* cited by examiner

*Primary Examiner*—Jorge L Ortiz Criado
*Assistant Examiner*—Aneeta Yodichkas
(74) *Attorney, Agent, or Firm*—Fitzpatrick, Cella, Harper & Scinto

(57) ABSTRACT

An information recording and reproducing apparatus including a recording medium that includes at least a substrate, a reflection layer disposed on the substrate, and a recording layer disposed so as to interpose the reflection layer between the substrate and the recording layer, and a near-field optical head, disposed close to the recording medium, for irradiating the recording medium with near-field light to effect recording and reproduction of information. The near-field optical head includes a light-blocking metal film which includes a dielectric base material provided with a small opening and which is disposed opposite to the reflection layer disposed on the substrate, so that the light-blocking metal film and the reflection layer constitute an optical resonator to increase intensity of the near-field light. The optical resonator satisfies the following resonance condition:

$$4\pi L/\lambda + \phi_1 + \phi_2 = 2m\pi,$$

wherein L represents an optical path between a bottom surface, of the near-field optical head, at which the light-blocking metal film is disposed; $\lambda$ represents a wavelength in a vacuum of a light source used in the near-field optical head; $\phi_1$ represents a phase shift due to reflection by the light-blocking metal film; $\phi_2$ represents a phase shift due to reflection by the reflection layer; and m represents a positive integer.

9 Claims, 3 Drawing Sheets

INFORMATION RECORDING AND REPRODUCING APPARATUS, INFORMATION RECORDING MEDIUM AND INFORMATION RECORDING APPARATUS

This application claims priority from Japanese Patent Application Nos. 2005-090988, filed Mar. 28, 2006, and 2006-018478, filed Jan. 27, 2006, which are hereby incorporated by reference herein.

FIELD OF THE INVENTION AND RELATED ART

The present invention relates to an information recording and reproducing apparatus, an information recording medium and an information recording apparatus. Particularly, the present invention relates to an information recording and reproducing apparatus capable of effecting recording and reproduction of information with near-field light with respect to a surface type phase change recording medium, a magneto-optical recording medium or a heat-assisted magnetic recording medium, an information recording medium, and an information recording apparatus.

As a high-density optical disk using light, CDs and DVDs are known. With rapid development of information technology in recent years, a further large-capacity recording system has been required. Thus, increasing density of information is further required. For this reason, when a recording pit is intended to be further decreased, a size of a light spot formed by ordinarily transmitted light is restricted by the diffraction limit. Accordingly, the decrease in the size of the light spot has limitations. As one of the methods for overcoming the limitations, near-field optical recording for forming a small recording pit by near-field light has been known.

Further, in recent years, in order to further improve a recording density of a magnetic disk, a recording and reproducing apparatus for effecting recording and/or reproduction of information with respect to a magneto-optical disk, while effecting thermal assist by near-field light, has been proposed in, e.g., U.S. Patent Application Publication No. 2002/0081461 A1.

The recording and reproducing proposed in the 2002/0081461 A1 publication will be described more specifically with reference to FIG. 4.

In the recording and reproducing apparatus described in the 2002/0081461 A1 publication, it is possible to adopt such a constitution that a reflection film is provided between a substrate and a magnetic recording layer constituting a magneto-optical disk 10. As shown in FIG. 4, the recording and reproducing apparatus is provided with a floating slider 43, floating due to rotation of the magneto-optical disk 10. At a floating surface 40 of the floating slider 43, a rail pattern 42 for feeding positive pressure or negative pressure is provided. Further, on the floating surface 40, a small opening 46 having a diameter smaller than the wavelength of light is formed. An optical fiber 44 is provided parallel to a suspension 38, in order to externally guide the light into the small opening 46. Further, a magnetic head 50 is provided on the floating surface 40. During information recording, the magnetic recording layer is irradiated with near-field light, so that a light irradiation portion is heated up to a temperature, which is not less than a Curie temperature, to be liable to cause a reversal of magnetization. A magnetic field corresponding to information is applied to a region in which the reversal of magnetization is liable to occur, so that information recording is magnetically performed.

Further, Japanese Laid-Open Patent Application No. 2003-331471 A1 has proposed such an optical recording system in which a surface type phase change recording medium is used as a recording medium, and is irradiated with near-field light issued from an optical head in a floating state, to effect high-density recording and reproduction.

The optical recording system proposed in published Japanese Patent Application No. 2003-331471 will be described more specifically with reference to FIG. 5.

A surface type phase change recording medium 1 used in the optical recording system described in the Japanese 2003-331471 publication is prepared by forming respective layers on a substrate 51 in lamination. More specifically, a reflection layer 52, a dielectric layer 53, a recording layer 54, a composite material layer 55 of ZnS and $SiO_2$, a protective layer 56, having a thermal conductivity higher than that of the composite material layer 55, and a lubricating layer 57, are formed by laminating these layers on the substrate 51, in this order.

In this optical recording system, an optical head 2 supported by an arm 5 is caused to be close to the surface type phase change recording medium 1 in a floating state. Then, near-field light emitted from the optical head 2 is caused to enter the recording layer 54 through the lubricating layer 57, to perform recording and/or reproduction.

In the above-described U.S. publication 2002/0081461 A1 and the Japanese 2003-331471 document, high density recording and reproduction can be effected by near-field light. However, a level thereof is not necessarily satisfactory in terms of a further increase in light intensity of near-field light and further efficient utilization of near-field light.

For example, in the U.S. publication 2002/0081461 A1, such a constitution, in which the magneto-optical recording medium using near-field light is provided with the reflection layer, is disclosed. However, the reflection layer can increase a signal intensity, but the increase in signal intensity is merely on the basis of an increased reflectance in the reflectance layer. Accordingly, it cannot be said that the increase is sufficient to further efficiently utilize near-field light.

Further, the surface type phase change recording medium described in the Japanese 2003-331471 publication is also provided with a reflection layer. However, similarly, as in the case described in the U.S. publication 2002/0081461 A1, it cannot be said that the constitution using only the reflection layer is sufficient to further efficiently utilize near-field light.

SUMMARY OF THE INVENTION

The present invention has been accomplished in view of the above-described problems.

An object of the present invention is to provide an information recording and/or reproducing apparatus capable of further efficiently utilizing near-field light.

Another object of the present invention is to provide an information recording medium usable in the information recording and/or reproducing apparatus, and an information recording apparatus using the information recording medium. According to an aspect of the present invention, an information recording and reproducing apparatus comprises:

a recording medium comprising at least a substrate, a reflection layer disposed on the substrate, and a recording layer disposed so as to interpose the reflection layer between the substrate and the recording layer; and a near-field optical head, disposed close to the recording medium, for irradiating the recording medium with near-field light, to effect recording and reproduction of information, wherein the near-field optical head includes a light-blocking metal film, which comprises a dielectric base material provided with a small opening and which is disposed opposite to the reflection layer disposed on the substrate, so that the light-blocking metal film and the reflection layer constitute an optical resonator to increase the intensity of the near-field light.

According to the present invention, it is possible to realize the information recording and/or reproducing apparatus, the information recording medium, and the information recording apparatus, which are capable of further efficiently utilizing near-field light.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
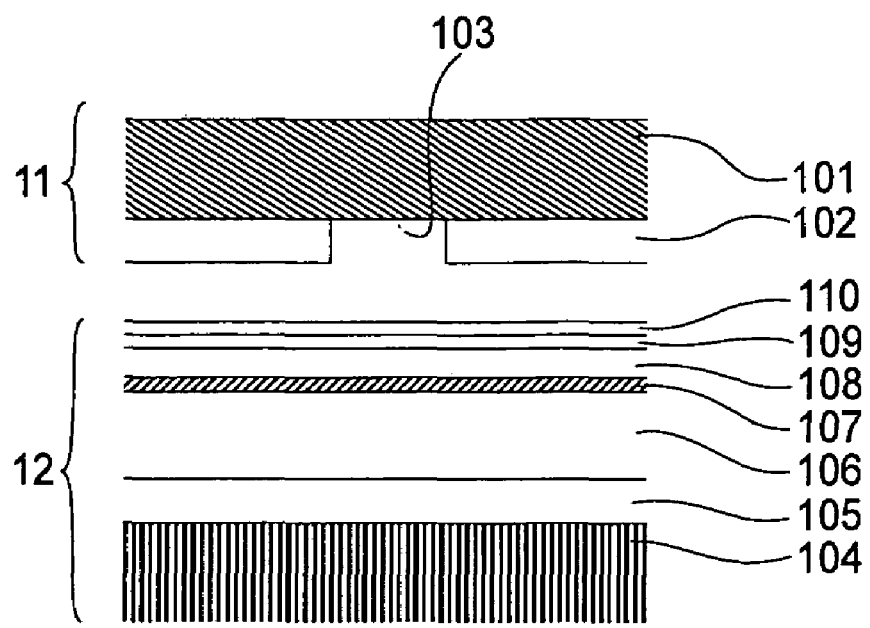
FIG. 1 is a schematic view showing a constitution of a principal portion of an information recording and reproducing apparatus using a surface type phase change recording medium in Embodiment 1 of the present invention.

The objects of the present invention can be accomplished by the above-described constitution. In embodiments of the present invention, the information recording and/or reproducing apparatus, the information recording medium, and the information recording apparatus according to the present invention can be configured in the following manner.

In this embodiment, the optical head is configured so that a light-blocking metal film is formed on a base material and is provided with a small opening having a width, which is not more than a wavelength of light. Further, the recording medium is configured to at least include a reflection layer formed on a substrate and a recording layer disposed on the reflection layer.

In this embodiment, when the recording medium is rotationally driven and a recording medium optical head is caused to come close to the recording medium, so as to perform recording and reproduction in a slight floating state from the recording medium, at an opposing portion between the light-blocking metal film of the optical head and the reflection layer on the substrate of the recording medium, a reflection surface of the light-blocking metal film and the reflection layer of the recording medium are configured to provide an optical resonator. As a result, oscillation of near-field light is amplified to increase the light intensity of near-field light, thus, effecting a large signal intensity.

In this case, the light intensity in the optical resonator can be enhanced by satisfying the following resonance condition:

$$4\pi L/\lambda + \phi 1 + \phi 2 = 2m\pi,$$

wherein L represents an optical path between a bottom surface, of the near-field optical head, at which the light-blocking metal film is disposed; $\lambda$ represents a wavelength in a vacuum of a light source used in the near-field optical head; $\phi 1$ represents a phase shift due to a reflection by the light-blocking metal film; $\phi 2$ represents a phase shift due to reflection by the reflection layer; and m represents a positive integer.

Further, in this embodiment, the light intensity in the optical resonator can be enhanced by satisfying the following resonance condition:

$$4\pi L/\lambda + \phi 1 + \phi 2 - \delta = 2m\pi,$$

wherein L represents an optical path between a bottom surface, of the near-field optical head, at which the light-blocking metal film is disposed; $\lambda$ represents a wavelength in a vacuum of a light source used in the near-field optical head; $\phi 1$ represents a phase shift due to reflection by the light-blocking metal film; $\phi 2$ represents a phase shift due to reflection by the reflection layer; $\delta$ represents a correction value, depending on a size of the small opening, determined by taking reflection at a light-blocking metal film/air interface and an angular spectrum of a near-field light distribution into consideration; and m represents a positive integer.

Further, in this embodiment, it is possible to increase the light intensity and near-field light in the recording layer by disposing the recording layer at a position satisfying the following relationship:

$$4\pi n d/\lambda + \phi 2 = 2m\pi,$$

wherein n represents a refractive index of a layer disposed between the reflection layer and the recording layer; d represents a thickness of the layer; $\lambda$ represents a wavelength of a light source; $\phi 2$ represents a phase shift due to reflection by the reflection layer; and m is a positive integer.

Further, in this embodiment, it is also possible to increase the light intensity of near-field light in the recording layer by disposing the recording layer at a position satisfying the following relationship:

$$4\pi \Sigma(ni \times di)/\lambda + \phi 2 = 2m\pi,$$

wherein n represents a refractive index of an i-th layer disposed between the reflection layer and the recording layer; d represents a thickness of the i-th layer; $\lambda$ represents a wavelength of a light source; $\phi 2$ represents a phase shift due to reflection by the reflection layer; and m is a positive integer.

In the present invention, the recording medium may be any one of a surface type phase change recording medium, a magneto-optical recording medium, a heat-assisted magnetic recording medium, etc.

In this case, the recording medium is used in a recording apparatus and an optical head for generating near-field light is caused to come close to the recording medium, and can irradiate the recording medium with near-field light, to effect recording in a recording layer.

Embodiments of the present invention will be described in more detail below.

Embodiment 1

In Embodiment 1, an information recording and reproducing apparatus capable of performing information recording and reproduction with near-field light with respect to a surface type phase change recording medium according to the present invention is used.

FIG. 1 shows a constitution of the information recording and reproducing apparatus of this embodiment. As shown in FIG. 1, an optical head 11 and a surface type phase change recording medium 12 constitute a principal portion of the information recording and reproducing apparatus of this embodiment.

The optical head 11 is constituted by a base material 101 of a dielectric material; a light-blocking metal film 102 formed on the base material 101; and a small opening 103, provided in the light-blocking metal film 102, having a width which is not more than a wavelength of light.

Further, the surface type phase change recording medium 12 has a lamination structure formed on a substrate 104.

More specifically, the lamination structure includes, for example, a 150 nm-thick reflection layer 105 of silver, a dielectric layer 106 of $ZnS.SiO_2$ formed on the reflection layer 105, a 15 nm-thick GeSbTe layer 107 as an optical phase change layer disposed on the dielectric layer 106; a dielectric layer 108 of $ZnS.SiO_2$ disposed on the GeSbTe layer 107; a protective layer 109 of silicon nitride disposed on the dielectric layer 108; and a lubricating layer 110, disposed on the protective layer 109, for assisting sliding of the optical head 11.

As a light source for the optical head 11, an active near-field light source including an integrated semiconductor laser is used, but the present invention is not limited thereto. For example, an optical head including an optical element, such as a lens, in addition to the above constitution, may be irradiated with external light from a light source.

In this embodiment, a floating type near-field optical head is used in order to effect information recording in and information reproduction from the recording medium, with near-field light, by causing the near-field optical head to come close to the recording medium.

Figure 2:
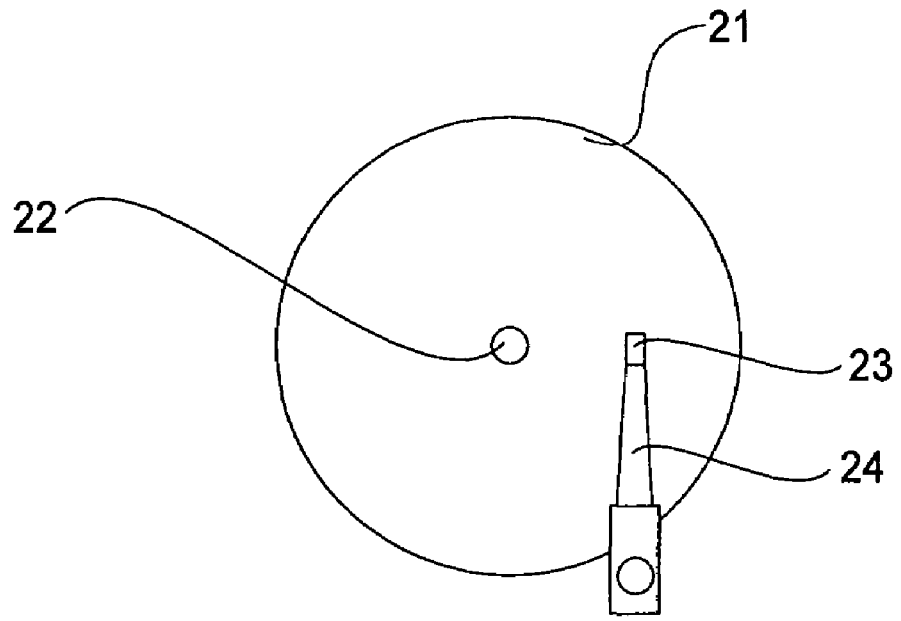
FIG. 2 is a schematic view showing a constitution of an information recording and reproducing apparatus using a floating type near-field optical head in Embodiment 1 of the present invention.

FIG. 2 shows a constitution including the floating type near-field optical head used in this embodiment.

In FIG. 2, reference numeral 21 represents a recording medium, reference numeral 22 represents a spindle shaft, reference numeral 23 represents an optical head, and reference numeral 24 represents an arm. The recording medium 21 is fixed on the spindle shaft 22 and rotationally driven by a spindle motor. The optical head 23, held by the arm 24, is caused to come close to the rotated recording medium 21, and recording and reproduction are performed in such a state that the optical head 23 slightly floats over the recording medium 21.

In such a slightly floating state of the floating type near-field optical head 11 from the recording medium 12, as shown in FIG. 1, the multi-layered recording medium 12 and the optical head 11 are configured to create an optical resonator between two reflection portions of these members 12 and 11.

More specifically, a lower mirror is constituted by a light reflection portion at an interface between the reflection layer 105 and the dielectric layer 106, and an upper mirror is constituted by a reflection portion at an interface between air filling a gap created by the floating (of the optical head) and the light-blocking metal film 102 provided with the small opening 103.

In addition, Fresnel reflection due to a difference in refractive index is also caused to occur at an interface between each of the dielectric layers and the phase change layer. However, compared with a reflectance by these Fresnel reflections, reflectances by the above-described mirrors are considerably large. Accordingly, a principal optical characteristic of the optical resonator can be well understood by considering a characteristic of a Fabry-Perot resonator having an optical path represented by the following equation (1):

$$L=\Sigma(ni \times di) \quad (1)$$

wherein L represents a cavity length; ni represents a refractive index of each layer; and di represents a thickness of each layer. As for a 0-th layer, n0=1 and d0=floating amount are used, while taking an air gap created by the floating into consideration. When the optical resonator in this embodiment is likened to the Fabry-Perot resonator having the cavity length L, a resonance condition in the case when light having a wavelength λ is introduced into the above-described optical resonator through the mirrors is represented by the following equation (2):

$$4\pi L/\lambda + \phi 1 + \phi 2 = 2m\pi \quad (m=1, 2, \ldots) \quad (2)$$

wherein φ1 and φ2 are phase shifts due to reflection by the respective reflection mirrors.

Similarly, as in the case of the Fabry-Perot resonator, when the resonance condition is satisfied, light intensity in the optical resonator is increased with the result that it is possible to obtain a large light transmittance.

In addition thereto, in the Fabry-Perot resonator including the optical head and the reflection layer, the resonance condition is affected by the following factors.

First, reflection at the lower reflection layer is that at a dielectric member/metal interface, so that the above-mentioned phase shift is approximately π.

Next, reflection at a light-blocking metal film/air interface will be considered.

With respect to the light-blocking metal film of the optical head, the phase shift at the light-blocking metal film/air interface is approximately π, but an amount of the phase shift in the neighborhood of the small opening is changed due to the presence of the small opening. This change increases the phase shift amount, so that it is larger than π. This is because, if there is no small opening, all of the light is reflected at the light-blocking metal film/air interface, but there is no small opening, in practice, so that a part of the light penetrates into the small opening and most of the thus penetrated light is eventually reflected to be returned to the resonator.

Further, when a near-field light distribution created immediately under the small opening is subjected to an angular spectral resolution, light energy includes, not only a component perpendicular to the light-blocking metal film/air interface, but also, components having outgoing angles from zero to ninety degrees.

In addition, there is also a component for exciting an evanescent wave, but the resonance condition is not affected by this component.

Of the above-described components of light energy, in the case when components having outgoing angles, which are not zero, but relatively small values, resonate in the Fabry-Perot resonator, it is possible to utilize an increase in light intensity in the resonator, while suppressing an adverse affect of enlarging a near-field spot due to the small opening.

In the case when the length of the resonator is slightly less than the resonance condition of vertical incident light, a resonance action with respect to such a small outgoing angle in the components is brought about. However, in the case when the length of the resonator is larger than the resonance condition, resonance with respect to the vertical component and the small outgoing angle components of an angular spectrum of near-field light from the small opening cannot be obtained.

Even in this case, with respect to large outgoing angle components, higher-order resonance can be obtained in some cases.

However, the resonance of the large outgoing angle components increases the spot size of near-field light so that it has no effect from the viewpoint of utilization of a small near-field light spot.

Accordingly, by introducing a correction term δ into the above-described equation (2), the resonance condition can be represented by the following equation (3):

$$4\pi L/\lambda + \phi_1 + \phi_2 - \delta = 2m\pi \ (m=1, 2, \ldots) \tag{3}$$

Under this resonance condition, the light introduced between the optical head and the lower reflection film through the small opening is guided in the resonator. More specifically, by the resonance of the resonator, intensity of near-field light generated through the small opening in the neighborhood of the small opening is increased. Further, in this case, the size of a light spot of the near-field light keeps an extent which is not more than a wavelength of light principally determined by the small opening.

Here, a specific value of the correction term 6 is an amount depending on the size of the small opening from two viewpoints of reflection at the light-blocking metal film/air interface and the angular spectrum of near-field light distribution, as an amount of the above-described penetration, and is valued between 0 and ¼π.

In order to increase the light intensity, particularly, in the phase change layer of the recording medium having the multi-layered structure, it is possible to design the multi-layered structure. For that purpose, the phase change layer may be disposed so that it is located at a ventral portion of a standing wave in the above-described resonator. As a result, it is possible to further enhance a utilization efficiency of near-field light.

Incidentally, even in the case when this resonator does not completely satisfy the resonance condition with respect to the wavelength λ of incident light, in order to increase the light intensity in the phase change layer, light reflection at an interface between the reflection layer 105 and the dielectric layer 106 is important.

A condition for increasing the light intensity at the position of the phase change layer is represented by an equation (4) shown below when a thickness from the phase change layer to the reflection layer is taken as d:

$$4\pi n d/\lambda + \phi_2 = 2m\pi \ (m=1, 2, \ldots) \tag{4}$$

Here, a phase shift φ2 at a dielectric member/metal interface is, approximately, π.

Further, in the case when a plurality of layers having different refractive indices is disposed between the phase change layer and the reflection layer, the phase change layer may be located at a position satisfying the following equation (5):

$$4\pi \Sigma(n_i \times d_i)/\lambda + \phi_2 = 2m\pi \ (m=1, 2, \ldots) \tag{5}$$

wherein ni represents a refractive indes of i-th layer and di represents a thickness of the i-th layer.

Despite optical recording using near-field light, the reason why the optical characteristic is affected by the lamination structure on the order of the wavelength of the light is as follows. When the near-field light distribution created immediately under the small opening is subjected to angular spectral resolution, there is always a component, which is converted into transmitted light, which is transmitted in a vertical direction. With respect to the transmitted light, as described above, by disposing the reflection layer at an appropriate position, it is possible to create such a condition that the transmitted light converted from the near-field light and its reflected light intensify each other. By utilizing the light satisfying the intensifying condition, as a result, it is possible to increase the utilization efficiency of near-field light generated by the small opening.

In the recording and reproducing apparatus in this embodiment, the light source is driven depending on a signal to be recorded, and the phase change layer is heated by near-field light generated in the neighborhood of the small opening of the optical head, thus performing optical writing of a data signal. Further, during reading, the recording medium is similarly irradiated with near-field light, and a change in reflectance of the phase change layer is read, thus performing reproduction of a data signal. Also, in this case, an intensity of near-field light is increased by utilizing resonance of the resonator, so that it is possible to obtain a large signal intensity.

Example 2

In Embodiment 2, a recording and reproducing apparatus, capable of performing information recording and reproduction with near-field light with respect to a heat-assisted magneto-optical recording medium according to the present invention, is used.

Figure 3:
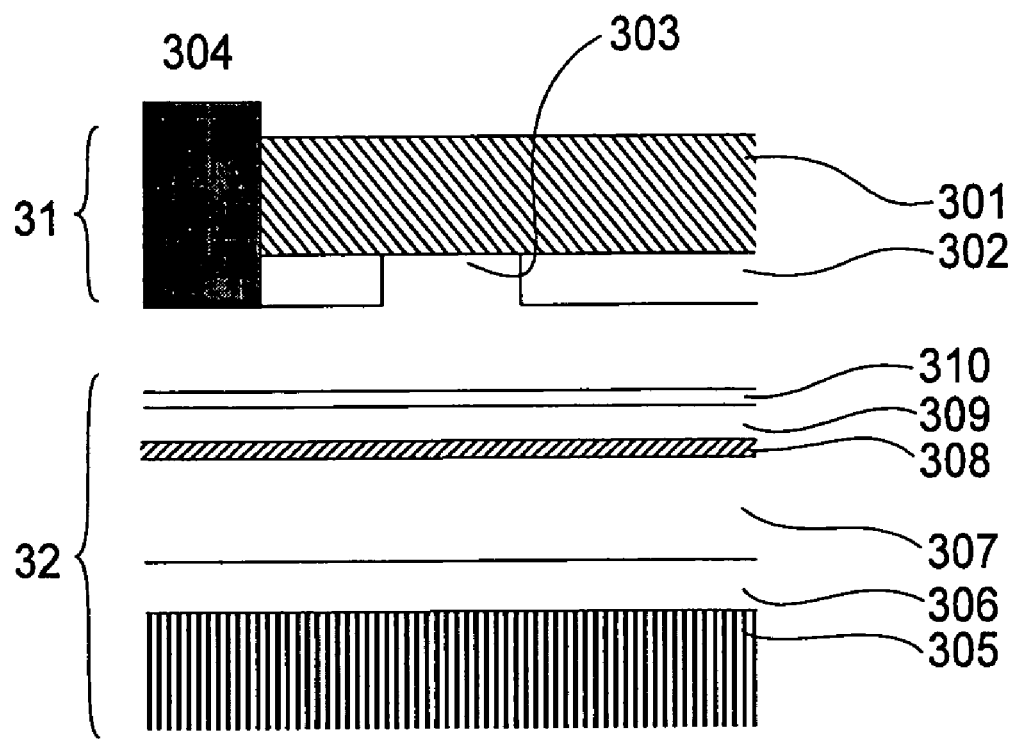
FIG. 3 is a schematic view showing a constitution of a principal portion of an information recording and reproducing apparatus using a heat-assisted magneto-optical recording medium in Embodiment 2 of the present invention.
Figure 4:
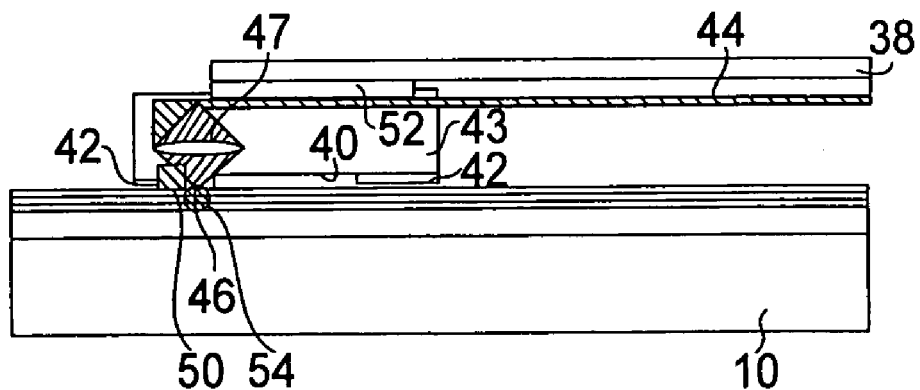
FIG. 4 is a schematic view for illustrating a constitution of a conventional recording and reproducing apparatus.
Figure 5:
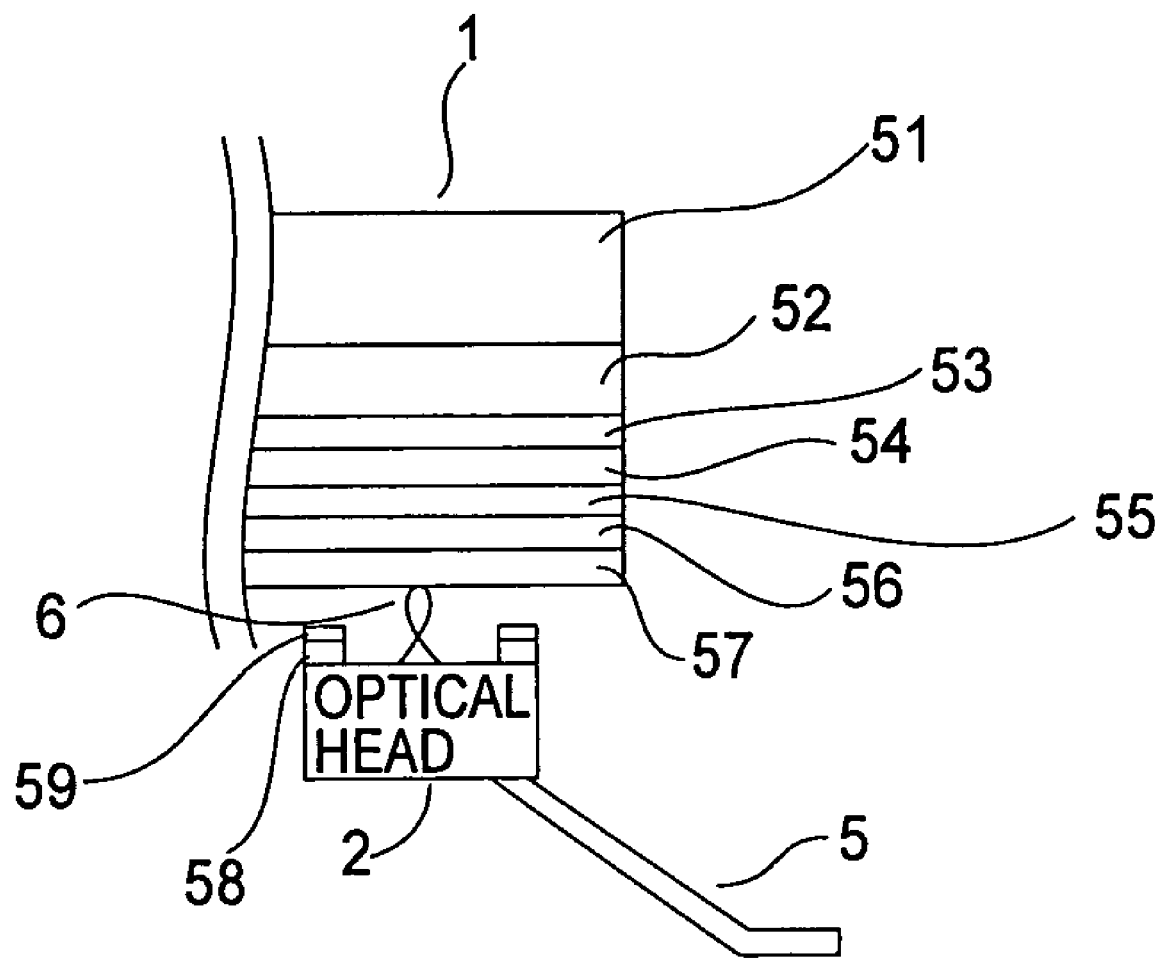
FIG. 5 is a schematic view for illustrating a constitution of a conventional optical recording system.

FIG. 3 shows a constitution of the information recording and reproducing apparatus of this embodiment. As shown in FIG. 3, an optical head 31 and a magneto-optical recording medium 32 constitute a principal portion of the information recording and reproducing apparatus of this embodiment.

The magneto-optical recording medium 32 has a lamination structure formed on a substrate 305.

More specifically, the lamination structure, e.g., includes a 150 nm-thick reflection layer 306 of silver, a dielectric layer 307 of silicon nitride formed on the reflection layer 306, a 20 nm-thick rare earth transition metal alloy layer, e.g., a Tb—Fe—Co layer 308, as a magneto-optical recording layer, disposed on the dielectric layer 307; a protective layer 309 of silicon nitride disposed on the magneto-optical recording layer 308; and a lubricating layer 310, disposed on the protective layer 309, for assisting sliding of the optical head 31.

The optical head 31 is constituted by a base material 301 of a dielectric material, a metal film 302 formed on the base material 301, a small opening 303, provided in the metal film 302, having a width, which is not more than a wavelength of light, and an exciting coil.

The optical head 31, held by an arm, is caused to come close to the rotating recording medium to effect recording and reproduction in a slightly floating state.

As a light source for the optical head 31, an active near-field light source, including an integrated semiconductor laser, is used, but the present invention is not limited thereto. For example, an optical head including an optical element, such as a lens, in addition to the above constitution, may be irradiated with external light from a light source.

By near-field light generated in the neighborhood of the small opening of the optical head, the magneto-optical recording layer is heated, so as to heat a light-irradiation portion up to a temperature not less than a Curie temperature. By applying a magnetic field corresponding to data, magnetization is reversed in a region in which magnetization is liable to be reversed, thus effecting magnetic recording of a data signal.

In this embodiment, similarly as in Embodiment 1, the recording and reproducing apparatus is configured to produce resonance at a writing wavelength in the resonator enclosed by the reflection layer and the light-blocking film of the optical head by appropriately selecting a cavity size of the resonator.

As a result, near-field light is introduced from the optical head into the resonator, so that it is possible to increase the light intensity of near-field light. Accordingly, it is possible to provide a magneto-optical recording system capable of efficiently performing heating of the magneto-optical layer at a small laser power.

Further, during information reproduction, a region in which magnetic recording is performed is irradiated with linearly polarized light through the small opening, and a rotation direction of a plane of polarization of reflected light is detected by utilizing the magnetic Kerr effect to read a signal. Also, in this case, it is possible to increase the read signal by resonance in the resonator constituted by the reflection layers (reflection portions) of the optical head and the recording medium. Alternatively, it is also possible to read the signal by an MR head or a GMR head, utilizing a magneto-resonance effect.

Further, similar to Embodiment 1, it is possible to increase the light intensity in the magneto-optical recording layer by controlling a distance between the reflection layer and the magneto-optical recording layer.

More specifically, the light intensity in the magneto-optical recording layer is increased when the reflectance in the reflection layer is increased, and one or two or more intermediary layers between the magneto-optical recording layer and the reflection layer, are configured to satisfy the above-described equation (4) or (5). Further, similar to Embodiment 1, this effect can be achieved even in the case when the resonator does not completely satisfy the resonance condition with respect to a wavelength $\lambda$ of incident light.

Further, this constitution has the function of increasing the light intensity in the recording layer, even during information reproduction using the light having the same wavelength, so that the S/N ratio is improved, and an intensity of the read signal is increased.

While the invention has been described with reference to the structures disclosed herein, it is not confined to the details set forth, and this application is intended to cover such modifications or changes as may come within the purpose of the improvements or the scope of the following claims.

What is claimed is:

1. An information recording and reproducing apparatus comprising:
   a recording medium comprising at least a substrate, a reflection layer disposed on the substrate, and a recording layer disposed so as to interpose the reflection layer between the substrate and the recording layer; and
   a near-field optical head, disposed close to said recording medium, for irradiating said recording medium with near-field light to effect recording and reproduction of information, wherein said near-field optical head includes a light-blocking metal film which comprises a dielectric base material provided with a small opening and which is disposed opposite to the reflection layer disposed on the substrates, so that the light-blocking metal film and the reflection layer constitute an optical resonator, to increase intensity of the near-field light,
   wherein the optical resonator satisfies the following resonance condition:

$$4\pi L/\lambda + \phi 1 + \phi 2 = 2m\pi,$$

wherein L represents an optical path between a bottom surface, of said near-field optical head, at which the light-blocking metal film is disposed; $\lambda$ represents a wavelength in a vacuum of a light source used in said near-field optical head; $\phi 1$ represents a due to reflection by the light-blocking metal film; $\phi 2$ represents a phase shift due to reflection by the reflection layer; and m represents a positive integer.

2. An apparatus according to claim 1, wherein the optical resonator satisfies the following resonance condition:

$$4\pi L/\lambda + \phi 1 + \phi 2 - \delta = 2m\rho,$$

wherein L represents an optical path between a bottom surface, of said near-field optical head, at which the light-blocking metal film is disposed; $\lambda$ represents a wavelength in a vacuum of a light source used in said near-field optical head; $\phi 1$ represents a phase shift due to reflection by the light-blocking metal film; $\phi 2$ represents a phase shift due to reflection by the reflection layer; $\delta$ represents a correction value, depending on a size of the small opening, determined by taking reflection at a light-blocking metal film/air interface and an angular spectrum of a near-field light distribution into consideration; and m represents a positive integer.

3. An apparatus according to claim 1, wherein said recording medium is one of a surface type phase change recording medium, a magneto-optical recording medium, and a heat-assisted magnetic recording medium.

4. An apparatus according to claim 1, wherein said near-field optical head further includes means for floating said near-field optical head, and is configured to be capable of being close to said recording medium in a floating state with respect to said recording medium.

5. A recording medium for being used in an information recording and reproducing apparatus according to claim 1, said recording medium comprising at least:
   a substrate;
   a reflection layer disposed on said substrate; and
   a recording layer disposed on said reflection layer,
   wherein said recording layer is located at a position at which light incident on said recording medium and light reflected by said reflection layer intensify each other.

6. A medium according to claim 5, wherein said recording medium satisfies the following relationship:

$$4\pi nd/\lambda + \phi 2 = 2m\pi,$$

wherein n represents a refractive index of a layer disposed between said reflection layer and said recording layer; d represents a thickness of the layer; $\lambda$ represents a wavelength of a light source; $\phi 2$ represents a phase shift due to reflection by said reflection layer; and m is a positive integer.

7. A medium according to claim 5, wherein said recording medium satisfies the following relationship:

$$4\pi \Sigma (ni \times di)/\lambda + \phi 2 = 2m\pi,$$

wherein n represents a refractive index of an i-th layer disposed between said reflection layer and said recording layer; d represents a thickness of the i-th layer; $\lambda$ represents a wavelength of a light source; $\phi 2$ represents a phase shift due to reflection by said reflection layer; and m is a positive integer.

8. A medium according to any one of claims 5-7, wherein said recording medium is one of a surface type phase change recording medium, a magneto-optical recording medium, and a heat-assisted magnetic recording medium.

9. A recording apparatus comprising:
   a recording medium according to any one of claims 5-7; and
   a near-field optical head for generating near-field light,
   wherein said near-field optical head is caused to be close to said recording medium and irradiates said recording medium with near-field light to effect recording in the recording layer.

* * * * *